United States Patent
Qiu et al.

(10) Patent No.: US 8,208,503 B2
(45) Date of Patent: Jun. 26, 2012

(54) FIBER LIGHT SOURCE WITH HIGH MEAN WAVELENGTH STABILITY AND RELIABILITY

(75) Inventors: Tiequn Qiu, Glendale, AZ (US); Steven J. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1 day.

(21) Appl. No.: 12/787,935

(22) Filed: May 26, 2010

(65) Prior Publication Data

US 2011/0292951 A1    Dec. 1, 2011

(51) Int. Cl.
*H01S 3/30* (2006.01)
(52) U.S. Cl. .................. 372/6; 372/32; 372/70; 372/98; 372/108
(58) Field of Classification Search ................. 372/6
See application file for complete search history.

(56) References Cited

U.S. PATENT DOCUMENTS

| | | | |
|---|---|---|---|
| 5,231,465 A | 7/1993 | Huang et al. | |
| 5,313,480 A | 5/1994 | Fidric et al. | |
| 5,608,742 A * | 3/1997 | Petersen | 372/6 |
| 6,041,072 A | 3/2000 | Ventrudo et al. | |
| 6,144,788 A | 11/2000 | Ang et al. | |
| 6,429,965 B1 | 8/2002 | Falquier et al. | |
| 6,483,628 B1 | 11/2002 | Digonnet et al. | |
| 6,801,319 B2 | 10/2004 | Szafraniec et al. | |
| 7,039,080 B1 * | 5/2006 | Talmadge et al. | 372/29.021 |
| 2002/0075560 A1 | 6/2002 | Foursa | |
| 2003/0133180 A1 | 7/2003 | Yang et al. | |
| 2005/0220161 A1 | 10/2005 | Bolshtyansky et al. | |
| 2009/0279166 A1 * | 11/2009 | Desbiens | 359/341.33 |

FOREIGN PATENT DOCUMENTS

| | | |
|---|---|---|
| DE | EP 0817335 A2 * | 7/1998 |
| EP | 0817335 | 1/1998 |
| EP | 1018666 | 7/2000 |
| EP | 1081813 | 3/2001 |
| EP | 1257023 | 11/2002 |
| EP | 1437808 | 7/2004 |
| EP | 1460736 | 9/2004 |

OTHER PUBLICATIONS

Huang et al., "Stable L-Band Superfluorescent Fiber Source Using One Pump", "Optical Engineering", Jul. 2009, pp. 075002-1 thru 075002-5, vol. 48(7).
European Patent Office, "European Search Report", Oct. 10, 2011, Published in: EP.

* cited by examiner

*Primary Examiner* — Jessica Stultz
*Assistant Examiner* — Xnning Niu
(74) *Attorney, Agent, or Firm* — Fogg & Powers LLC (57) ABSTRACT

A broadband light source configured to emit a stable broadband optical beam is provided. The broadband light source includes at least one optical pump source, an optical system including a polarization beam combiner, and a solid state laser medium. The optical system is configured to receive at least one optical pump beam from a respective one of the at least one optical pump source. The solid state laser medium receives a substantially unpolarized pump beam from a first output of the optical system. Stable broadband amplified spontaneous emission is output from a second output of the optical system.

10 Claims, 5 Drawing Sheets

FIBER LIGHT SOURCE WITH HIGH MEAN WAVELENGTH STABILITY AND RELIABILITY

BACKGROUND

Fiber light sources (FLS) are commonly used with interferometric fiber optic gyroscopes (IFOGs) because of their broad bandwidth, high power, and relatively good mean wavelength stability compared to other compact light sources. With the development of reliable pump lasers and improved output power and wavelength control, the reliability and stability of such fiber light sources have improved significantly since their inception. However, there are still demands to improve FLS reliability and mean wavelength stability in high end IFOGs in mission-critical applications.

The reliability of the FLS depends in large part on the reliability of the pump laser. Therefore, use of redundant or backup pumps can substantially increase the FLS reliability. In one configuration to accommodate a backup pump, a 2×2 fiber coupler is used to combine and direct the outputs of two pump lasers to the gain medium. This configuration results in waste of half of the pump power when a single end pumping scheme is used. In another configuration, dual-end pumping schemes are used to improve the efficiency, however, these configurations result in compromised wavelength stability due to sensitivity to power splitting ratio changes of the 2×2 coupler.

FLS mean wavelength instability on the order of a few tens of parts per million (ppm) is common even after tight control of pump laser power and pump wavelength fluctuations. This FLS wavelength instability originates from polarization hole burning effects in Erbium Doped Fiber (EDF) due to instability of pump laser polarization states in the single mode EDF. Depolarizing the pump light by fiber depolarizers and use of polarization maintaining (PM) EDF have been suggested in prior art to reduce this effect. Polarization multiplexing of two pump lasers with equal power and orthogonal polarization states was suggested. However, this scheme requires simultaneous operation of two pump lasers with strict requirements in polarization state and power in order to reduce the mean wavelength instability. If one pump is used as a backup in this scheme, the only pump that is turned on will not be depolarized, leading to FLS wavelength instability due to polarization hole burning in EDF.

SUMMARY

The present application relates to a broadband light source configured to emit a stable broadband optical beam. The broadband light source includes at least one optical pump source, an optical system including a polarization beam combiner, and a solid state laser medium. The optical system is configured to receive at least one optical pump beam having a respective at least one pump coherence length from a respective one of the at least one optical pump source. The solid state laser medium receives a substantially unpolarized pump beam from a first output of the optical system. Stable broadband amplified spontaneous emission is output from a second output of the optical system.

DRAWINGS

In accordance with common practice, the various described features are not drawn to scale but are drawn to emphasize features relevant to the present invention. Like reference characters denote like elements throughout figures and text.

DETAILED DESCRIPTION

The broadband light sources described herein are configured to generate light with highly stable mean wavelength by reducing sensitivity to pump polarization fluctuations in the gain medium while allowing an efficient pump laser backup scheme to improve reliability. In one implementation of this embodiment, the broadband light source is a fiber light source (FLS), such as a superfluorescent fiber source (SFS). The broadband light sources described herein can be used as a light source in fiber optic gyroscope (FOG) applications or other applications requiring stable broadband light sources. The stable broadband light sources described herein emit a stable broadband optical beam that is also referred to as stable broadband amplified spontaneous emission.

Figure 1:
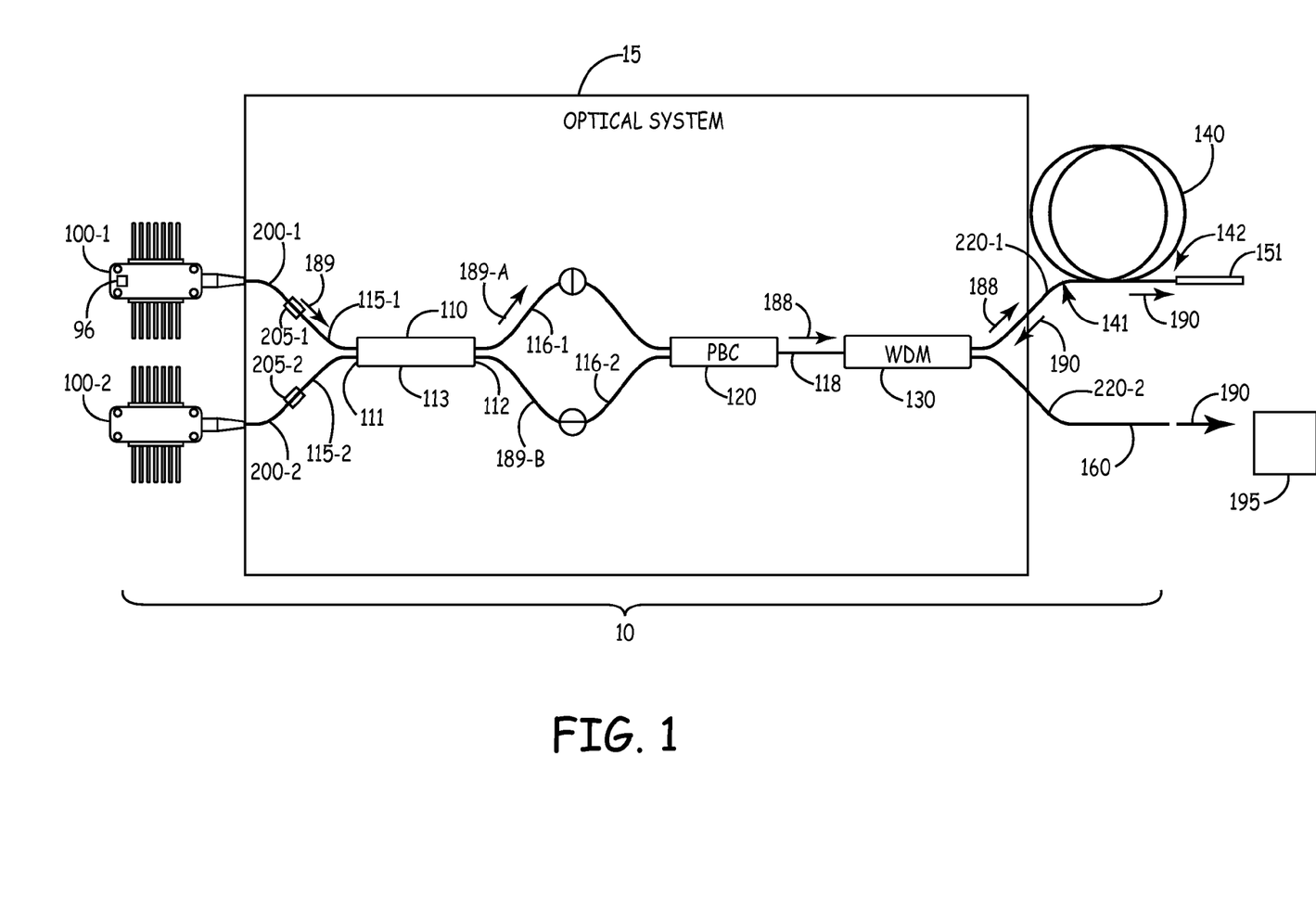
FIGS. 1 and 2 show embodiments of broadband light sources in accordance with the present invention.
Figure 2:
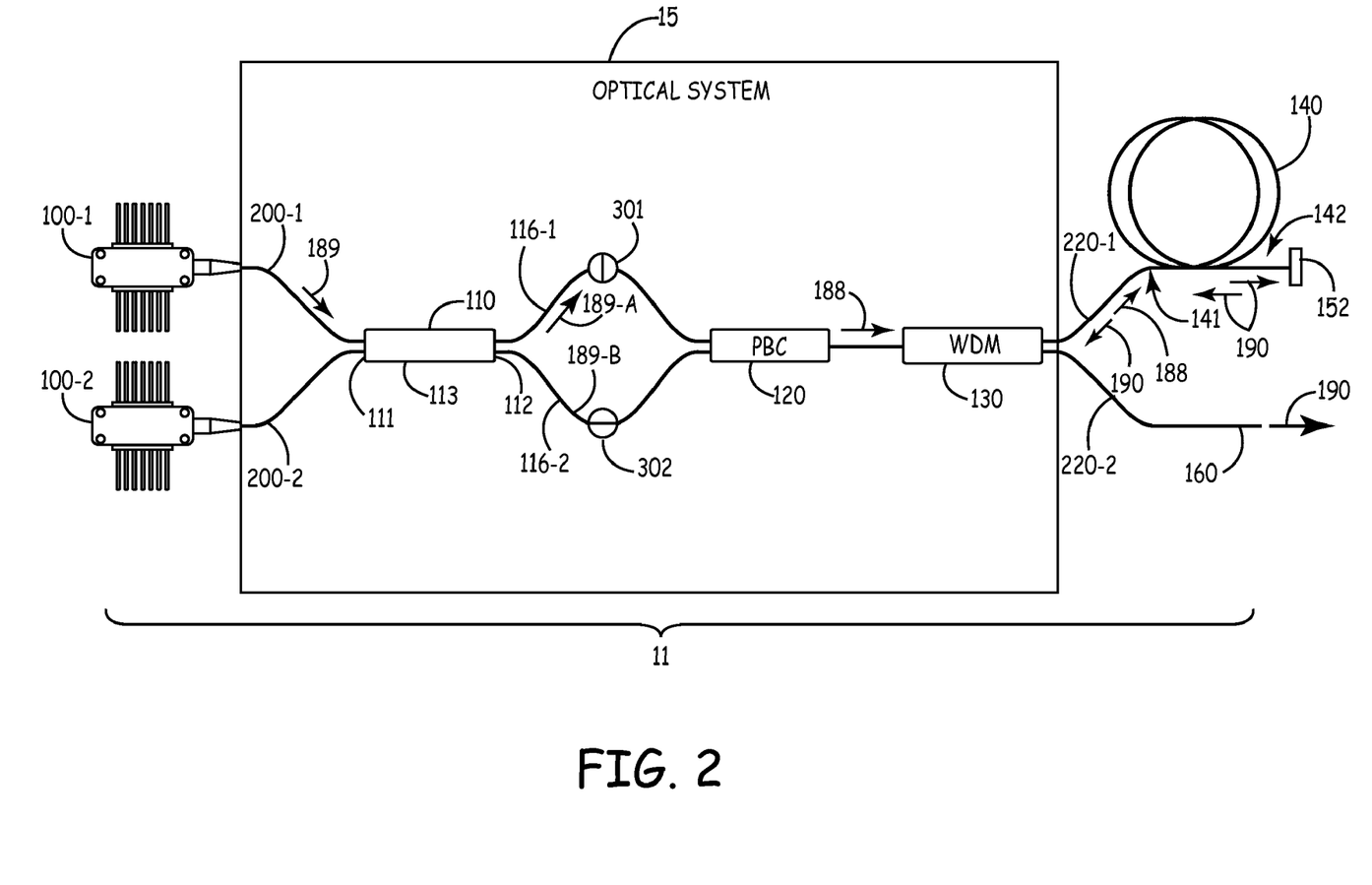

FIGS. 1 and 2 show embodiments of broadband light sources in accordance with the present invention. FIG. 1 shows a broadband light source 10. The broadband light source 10 (also referred to herein as a "fiber light source 10") includes at least one optical pump source 100-1, an optical system 15, and a doped optical fiber 140 terminated by a terminating element 151. The exemplary fiber light source 10 shown in FIG. 1 includes two optical pump sources 100(1-2) for reliability improvement. One of the pump sources may be used as a backup unit in case of a device failure or degradation of the device. Alternately, both pump sources 100(1-2) may operate simultaneously at a lower driving current so that the life time of each pump source 100(1-2) can be significantly longer. In either case, none of the optical pump power is wasted. The exemplary optical system 15 shown in FIG. 1 is a system used to direct and precondition the pump beam for excitation of the doped fiber 140.

Optical system 15 includes a 2×2 polarization maintaining (PM) coupler 110 with a tap ratio substantially close to 50% (e.g., approximately 50% of the optical power is directed to a first output 116-1 and approximately 50% of the optical power is directed to a second output 116-2), a polarization beam combiner (PBC) 120, and an optical wavelength division multiplexer (WDM) coupler 130. The 2×2 polarization maintaining (PM) coupler 110 is also referred to herein as a "polarization maintaining splitter 110." The doped optical fiber 140 is a solid state laser gain medium 140 having characteristics to generate amplified spontaneous emission (ASE) with a desired spectral bandwidth when pumped by the optical pump beam. Other types of solid state laser medium can be implemented in place of the doped optical fiber 140.

The optical pump sources 100(1-2) output a pump beam indicated in the drawings as a vector numerically labeled 189, which is an optical beam having an optical spectrum approximately centered on a pump wavelength $\lambda_p$. The spectral width (bandwidth) of the optical beam is typically defined as the full width at half-maximum (FWHM). The terms "optical pump beam" and "pump beam" are used interchangeably herein. The terms "optical beam" and "beam" are used interchangeably herein. Typically, an optical beam emitted from a laser source, such as optical pump sources 100(1-2), is linearly polarized. As defined herein, a typical pump bandwidth is on the order of a fraction of a nanometer to several nanometers. The optical beam 189 has a pump coherence length. As defined herein, the pump coherence length is the optical coherence length of the optical pump beam 189 propagating along an optical path. The optical coherence length is approximately $L_{OC}=c/4\pi\Delta f$, where c is the speed of light, and $\Delta f$ is the bandwidth of the optical pump beam.

The pump beam excites the dopants (typically, rare earth ions) in the doped optical fiber 140 so that the doped optical fiber 140 bidirectionally emits light in a broad wavelength range (broad bandwidth) reliably positioned on a mean spontaneous emission wavelength $\lambda_{ASE}$ (also referred to herein as "mean wavelength $\lambda_{ASE}$" and "spontaneous emission wavelength $\lambda_{ASE}$"). The mean wavelength $\lambda_{ASE}$ of a broadband source is the averaged wavelength weighted over the source power spectrum as shown in equation (1):

$$\overline{\lambda_{ASE}} = \frac{\int_{\lambda_1}^{\lambda_2} \lambda P(\lambda) d\lambda}{\int_{\lambda_1}^{\lambda_2} P(\lambda) d\lambda} \quad (1)$$

where $\lambda_1$ and $\lambda_2$ are the minimum and maximum wavelengths in the spectral range. As defined herein, a broad bandwidth is on the order of tens of nanometers. In one implementation of this embodiment, a large bandwidth is greater than 30 nm (FWHM) for a spontaneous emission wavelength $\lambda_{ASE}$ of 1550 nm. An optical beam emitted in a broad spectral range is referred to herein as a broadband optical beam. As defined herein, the broadband amplified spontaneous emission is considered a stable broadband optical beam when the mean wavelength $\lambda_{ASE}$ of the broadband amplified spontaneous emission varies by less than a few parts per million (ppm) of the mean wavelength $\lambda_{ASE}$. The terminating element 151 absorbs light emitted from one end of the doped fiber in a wavelength range that encompasses the spontaneous emission wavelength $\lambda_{ASE}$.

The 2×2 PM coupler 110, the polarization beam combiner (PBC) 120, and the WDM coupler 130 each have an operating wavelength range that encompasses the pump wavelength $\lambda_p$ of the light emitted by the optical pump sources 100(1-2). All the fibers connecting the pumps, the 2×2 PM coupler, and the PBC are polarization maintaining (PM) fibers. The 2×2 PM coupler splits the power of input light from any of the two input fibers 200(1-2) according to a specific ratio (ideally 50-50% for this embodiment), and directs them into the output fibers 116(1-2) as respective optical beams 189(A-B). If the pump laser is linear polarized and coupled mostly along one of the polarization axes of the PM optical fiber 200-1 or 100-2, the output light from optical fibers 116(1-2) is also mostly linearly polarized along one polarization axis. The PM optical fiber 200-1 and 100-2 differ in optical path length by more than the pump coherence length of the optical beam 189.

By rotating the PM fiber axis of the first optical fiber 116-1 by 90° with respect to the PM fiber axis of second optical fiber 116-2 and by putting the optical delay between the two optical paths, the polarization beam combiner 120 combines the two input beams in orthogonal polarization states into an unpolarized output beam 188 (containing equal amount of light in the two orthogonal polarization states). This unpolarized light 188 is directed by the WDM coupler 130 to pump the doped optical fiber 140. Conversion of a polarized pump beam into an unpolarized beam is advantageous for reducing sensitivity of the FLS mean wavelength to pump beam polarization fluctuations in the doped fiber 140.

The unpolarized spontaneous emission 190 generated in the doped optical fiber 140 has a stable mean wavelength $\lambda_{ASE}$ and is output to the WDM coupler 130, which directs the stable broadband amplified spontaneous emission (ASE) 190 to an output fiber 160 of the fiber light source 10. This stable broadband amplified spontaneous emission 190 is input to an external component 195, such as a fiber optic gyroscope or another component/system that requires a highly stable broadband optical source.

The spectral shape of the stable broadband ASE 190 does not vary in time. The pump lasers 100(1-2) are selected to have substantially the same wavelength and linewidth so that the spectral shape of the stable broadband ASE 190 remains substantially the same regardless of which of the optical pump sources 100(1-2) is pumping the doped optical fiber 140. In one implementation of this embodiment, the stable broadband ASE 190 is in a conventional wavelength band (C-band 1525-1565 nm). In another implementation of this embodiment, the stable broadband ASE 190 is in a long wavelength band (L-band 1565-1605 nm).

The optical pump sources 100(1-2) include fiber pig tails 200(1-2), respectively, that are configured to couple light from the optical pump sources 100(1-2). The 50/50 2×2 PM coupler 110 has a main body 113 coupled to two input fibers 115(1-2) at an input port 111 and two output fibers 116(1-2) at an output port 112. In one implementation of this embodiment, the main body 113, the two input fibers 115(1-2), and the two output fibers 116(1-2) are formed from two fibers that are fused together to provide the required 50/50 polarization independent coupling. The fiber pigtail 200-1 of the optical pump source 100-1 is coupled to the input fiber 115-1 of the 50/50 2×2 PM coupler 110 by a splice 205-1 and the fiber pig tail 200-2 of the optical pump source 100-2 is coupled to the input fiber 115-2 of the 50/50 2×2 PM coupler 110 by a splice 205-2.

The polarization maintaining coupler 110 receives at least one optical pump beam from optical pump source 100-1 and/or 100-2 at a respective at least one input 115-1 and/or 115-2, and outputs first and second optical pump beams 189-A and 189-B having substantially equal amplitudes and polarizations. The polarization maintaining splitter 110 is shown in FIG. 1 as a 50/50 2×2 PM coupler 110 that splits the amplitude of an input optical beam with a tap ratio of about 50% while preserving the state of the polarization of the input beam. Thus, approximately 50% of the optical power, regardless of the polarization of the input optical power, is output to each of the output fibers 116(1-2).

In this manner, the optical pump beam has become first and second optical pump beams 189-A and 189-B, respectively. The first and second optical pump beams 189-A and 189-B propagate along respective first and second optical paths, shown in FIG. 1 as output fibers 116-1 and 116-2. One of the first and second optical paths 116-1 and 116-2 includes a rotational component, which rotates by 90° the polarization of the respective first and second optical pump beams 189-A and 189-B with respect to the polarization of the respective second and first optical pump beam 189-B and 189-A. As shown in FIG. 1, the rotational component is the output fiber 116-2. In this manner, the polarization beam combiner 120 receives the orthogonally polarized equal-amplitude first and second optical pump beams 189-A and 189-B propagating along the first and second optical paths 116-1 and 116-2, which have an optical path length difference greater than the pump laser coherence lengths of the first and second optical pump beams 189-A and 189-B.

The polarization beam combiner (PBC) 120 combines the two orthogonal polarization beams to form a substantially unpolarized pump beam 188, which is coupled to an optical fiber 118. The substantially unpolarized pump beam 188 (also referred to herein as "unpolarized pump beam 188) is indicated in the drawings as a vector numerically labeled 188. As is known in the art, the amplitude of the electric field in one direction, for example $E_x$, is equal to the amplitude of the electric field in an orthogonal direction, for example $E_y$, for an unpolarized optical beam propagating in the z direction. The output from the optical fiber 118 is coupled into the WDM coupler 130. The WDM coupler 130 is configured to transmit light at the pump wavelength $\lambda_p$ from the optical fiber 118 to a first optical fiber arm 220-1 of the WDM coupler 130. The first optical fiber arm 220-1 of the WDM coupler 130 is also referred to herein as a first output 220-1 of the optical system 10. The fibers in the broadband light source 10, such as optical fiber 118, first and second optical fiber arms 220(1-2) and the doped optical fiber 140 are not polarization maintaining fibers.

The WDM coupler 130 couples the beam received from the optical fiber 118 to the first optical fiber arm 220-1. In one implementation of this embodiment, the WDM coupler has at least 20 dB extinction ratio between the $\lambda_{ASE}$ and $\lambda_p$, therefore less than 1% of the optical power input to the WDM coupler 130 from the polarization beam combiner 120 is directed to a second optical fiber arm 220-2 of the WDM coupler 130. The second optical fiber arm 220-2 of the WDM coupler 130 is also referred to herein as a second output 220-2 of the optical system 10.

The first optical fiber arm 220-1 is coupled to the doped optical fiber 140 at a first end, the location of which is indicated by the arrow 141. In one implementation of this embodiment, the first optical fiber arm 220-1 is spliced to the first end 141 of doped optical fiber 140. In another implementation of this embodiment, the first optical fiber arm 220-1 is fused to the first end 141 of the doped optical fiber 140.

The substantially unpolarized (depolarized) pump beam 188 at pump wavelength $\lambda_p$ stimulates the dopants in the doped optical fiber 140, which generate a stable broadband ASE 190 positioned on the mean spontaneous emission wavelength $\lambda_{ASE}$. There is no polarization hole burning effect in the doped optical fiber 140 by the unpolarized pump beam 188, so the mean wavelength $\lambda_{ASE}$ of the generated broadband ASE 190 is stable over time. In this manner, the broadband ASE 190 having a stable wavelength is bidirectionally emitted from the doped optical fiber 140. The terminating element 151, such as a terminating fiber 151, which is coupled to a second end 142 of the doped optical fiber 140, absorbs the broadband ASE 190 that is output from the second end 142.

The WDM coupler 130 is configured to direct the backward propagating broadband ASE 190 from the first optical fiber arm 220-1 to the second optical fiber arm 220-2. The second optical fiber arm 220-2 of the WDM coupler 130 is also referred to herein as a second output 220-2 of the optical system 10. In one implementation of this embodiment, the WDM coupler has at least 20 dB extinction ratio between the $\lambda_{ASE}$ and $\lambda_p$, therefore less than 1% of the broadband ASE 190 is transmitted from the first end 141 to the optical fiber 118.

In one implementation of this embodiment, the optical pump source 100-1 is ON (also referred to herein as the ON state) and the optical pump source 100-2 is OFF (also referred to herein as the OFF state). In this embodiment, the second optical pump source 100-2 is in a backup optical pump source in the event of a failure or degradation of the first optical pump source 100-1. There may be a photodetector 96 to monitor the first optical pump source 100-1. When there are indicators of failure, degradation, or malfunction of optical pump source 100-1, the backup optical pump source 100-2 is turned on in replacement of optical pump source 100-1. In another implementation of this embodiment, the optical pump source 100-1 is OFF and the optical pump source 100-2 is ON so the first optical pump source 100-1 is a backup optical pump source in the event of a failure or degradation of the second optical pump source 100-2. In this case, there is a monitoring photodetector for the second optical pump source 100-2.

In yet another implementation of this embodiment, both the optical pump sources 100-1 and 100-2 are ON in a dual-pump configuration. If the optical pump sources 100(1-2) are both driven with low level operating currents, the dual-pump configuration increases the lifetime of the optical pump sources 100(1-2). If the optical pump sources 100(1-2) are both driven with relatively high level operating currents, the dual-pump configuration increases the output of the broadband light source 10.

In one implementation of this embodiment, the optical pump sources 100(1-2) are laser diodes, such as edge emitting diodes or vertical cavity surface emitting laser (VCSEL) diodes. In another implementation of this embodiment, the optical pump sources 100(1-2) generate light having a wavelength of approximately 980 nm or 1480 nm and the doped optical fiber 140 is a silicon dioxide fiber doped with erbium ($Er^{3+}$) rare earth elements that emits an broadband ASE 190 approximately centered about the wavelength 1550 nm. Such a doped optical fiber 140 is also referred to herein as an Er-doped fiber (EDF). In this case, the WDM coupler 130 is configured to separate the pump wavelength of 980 nm from the spontaneous emission wavelength 1550 nm. In yet another implementation of this embodiment, the WDM coupler 130 reflects light above the wavelength of 1520 nm. In yet another implementation of this embodiment, the doped optical fiber 140 is a silicon dioxide fiber doped with neodymium ($Nd^{3+}$) rare earth elements. In yet another implementation of this embodiment, the doped optical fiber 140 is an erbium-ytterbium co-doped fiber (EYDF).

FIG. 2 shows a broadband light source 11 in which the doped optical fiber 140 is configured as a double-pass amplified spontaneous emission source. The broadband light source 11 (also referred to herein as fiber light source 11) includes two optical pump sources 100(1-2), a 2×2 polarization maintaining (PM) coupler 110 with a substantially 50% tap ratio, a polarization beam combiner (PBC) 120, a wavelength division multiplexer (WDM) coupler 130, and a doped optical fiber 140 terminated by a reflector 152. Thus, broadband light source 11 differs from broadband light source 10 by the replacement of the terminating element 151 with the reflector 152. The reflector 152 reflects the forward propagating broadband ASE 190 (propagating toward the second end 142) in a backward direction so that it is output from the first end 141. This reflected broadband ASE 190 propagates through the doped optical fiber 140 a second time to the WDM coupler 130. The doped optical fiber 140 exhibits gain at the broadband ASE wavelength so the broadband ASE 190 is further amplified in the second pass through the doped optical fiber 140. In this manner the power (amplitude) of broadband ASE 190 is increased. On both passes, the broadband ASE 190 remains unpolarized and there is no polarization hole burning in the doped optical fiber 140. In one implementation of this embodiment, the length and dopant levels of the doped optical fiber 140 are selected to minimize the sensitivity of broadband ASE mean wavelength to optical pump power fluctuations. In this case, the optical pump beam 180 may not totally be converted into broadband ASE 190. For case shown in FIG. 1, the terminating fiber 151 absorbs the optical pump beam 180 that reaches the second end 142 of the doped optical fiber 140. For embodiment shown in FIG. 2, reflector 152 may or may not reflect the residual pump beam back to the doped fiber 140.

Figure 3:
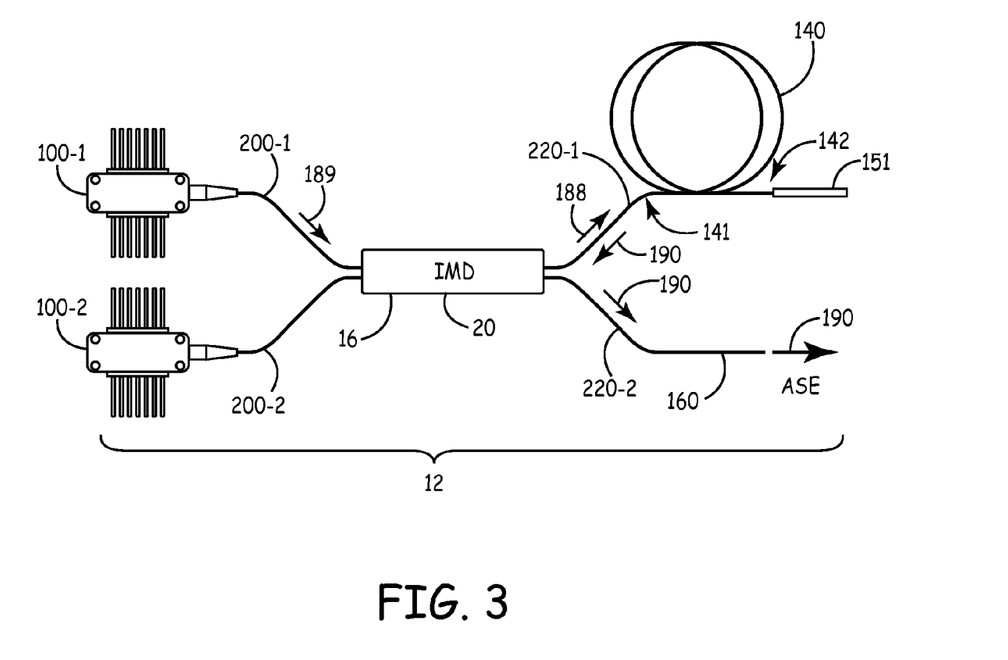
FIG. 3 shows an embodiment of a broadband light source including an integrated micro-optic device in accordance with the present invention.

FIG. 3 shows an embodiment of a broadband light source 12 including an integrated micro-optic device 20 in accordance with the present invention. The integrated micro-optic device 20 is also referred to herein as an optical system 20 and is shown in more detail in FIG. 4. As shown in FIG. 3, the integrated micro-optic device 20 is coupled to receive a pump beam 189 at a pump wavelength $\lambda_p$ from at least one of the optical pump source 100-1 or 100-2. As shown in FIG. 3, the optical pump source 100-2 is in an OFF state and the optical pump source 100-1 is in an ON state. In one implementation of this embodiment, the optical pump source 100-1 is in an OFF state and the optical pump source 100-2 is in an ON state. In another implementation of this embodiment, the optical pump sources 100(1-2) are both in the ON state.

An optical beam 189 is coupled from the optical pump source 100-1 via fiber pig tail 200-1 to an input of the integrated micro-optic device 20. The substantially unpolarized pump beam 188 is output from the integrated micro-optic device 20 and coupled to the doped optical fiber 140 via the first optical fiber arm 220-1. As described above with reference to FIG. 1, the pump wavelength $\lambda_p$ stimulates the dopants in the doped optical fiber 140 and the stable broadband ASE 190 positioned on the spontaneous emission wavelength $\lambda_{ASE}$ is coupled backward to the integrated micro-optic device 20. The terminating fiber 151, which is coupled to a second end 142 of the doped optical fiber 140, absorbs the broadband ASE 190 that is output from the second end 142. In one implementation of this embodiment, a reflector 152 (as shown in FIG. 2) is at the second end 141 of the doped optical fiber 140.

Figure 4:
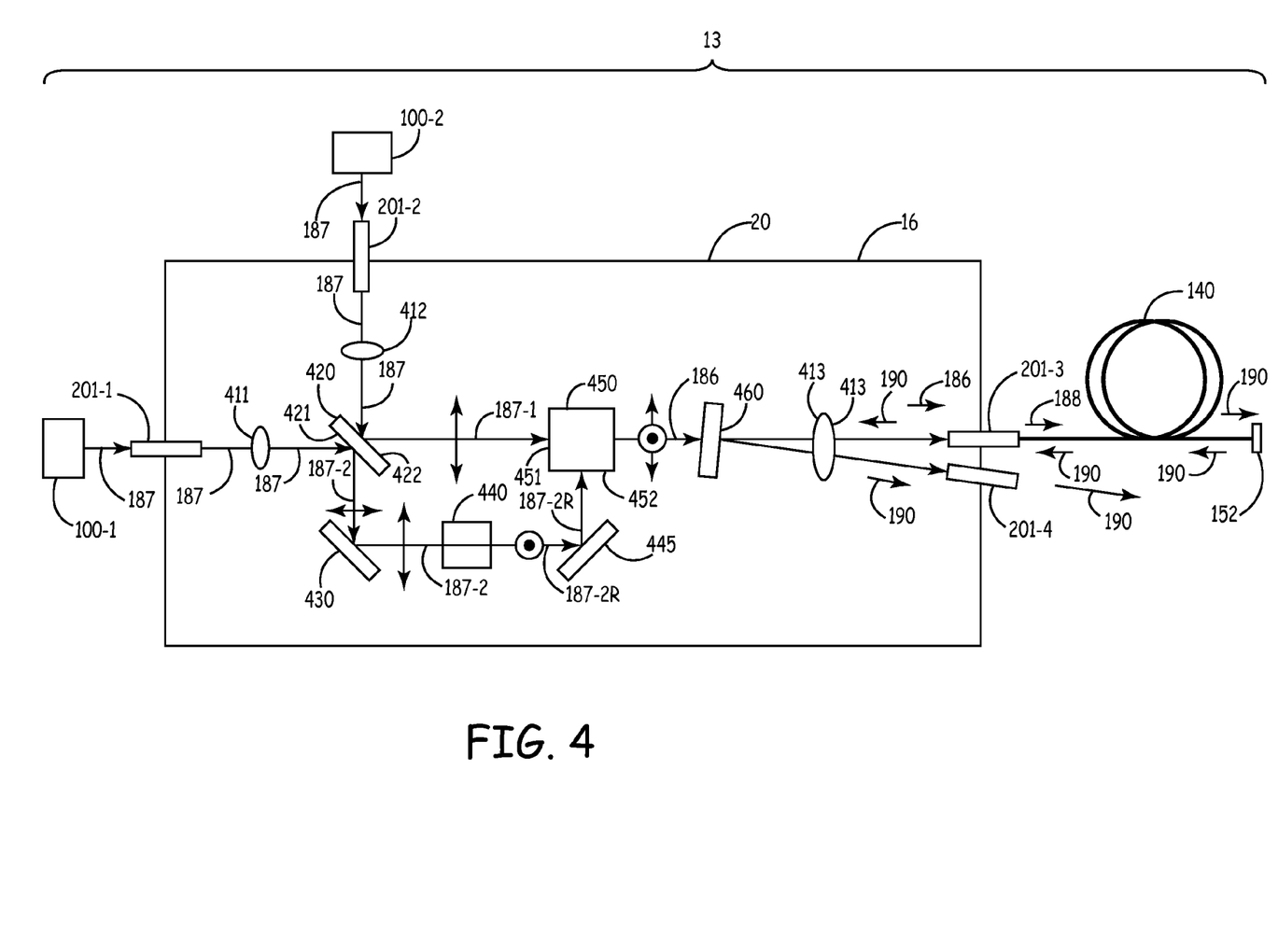
FIG. 4 shows an embodiment of an integrated micro-optic device for use in a broadband light source in accordance with the present invention.

FIG. 4 shows an embodiment of the integrated micro optic device 20 for use in the broadband light source 13 (also referred to herein as fiber light source 13) in accordance with the present invention. The integrated micro-optic device 20 includes optical components configured to receive polarized pump beams 187 from one or both of the optical pump sources 100(1-2) via one or both of first and second polarization maintaining fibers 201(1-2), respectively. The optical components in the integrated micro-optic device 20 are further configured to output an unpolarized optical pump beam 188 as input to the doped optical fiber 140 via a third polarization maintaining fiber 201-3 and to output broadband ASE 190 from the integrated micro-optic device 20 via a fourth polarization maintaining fiber 201-4. All the optical components in the integrated micro-optic device 20 are operable at the pump wavelength and or the wavelengths of the broadband ASE 190. In one implementation of this embodiment, the doped optical fiber 140 is replaced by a crystalline solid state laser medium.

The first polarization maintaining fiber 201-1 is configured to receive a polarized pump beam 189 from the first optical pump source 100-1 and to direct the polarized pump beam to be incident on a first lens 411. A second polarization maintaining fiber 201-2 is coupled to receive a polarized pump beam 189 from the second optical pump source 100-2 and to direct the polarized pump beam to be incident on a second lens 412. Both of the optical pump sources 100-1 or 100-2 are shown in the ON state, although only one of the optical pump sources 100-1 or 100-2 is required to be in the ON state for operation of the broadband light source 13. In one implementation of this embodiment, pump sources are semiconductor lasers which generate linearly polarized beam due to cavity gain difference of the waveguide for vertical and horizontal polarized light. As is known in the art, the electric field vector of the s-polarized beam is perpendicular to the plane of incidence and the electric field vector of the p-polarized beam is parallel to the plane of incidence. For the exemplary embodiment shown in FIG. 4, the optical pump source 100-1 and/or 100-2 are configured to provide p-polarized pump power to the first polarization maintaining fiber 201-1 and/or second polarization maintaining fiber 201-2, respectively. In one implementation of this embodiment, the first and second polarization maintaining fibers 201(1-2) are not orthogonally positioned as shown in FIG. 4, but are parallel to each other in a manner similar to the optical fibers 200(1-2) in FIG. 3. In this case, an additional mirror is added to the integrated micro optic device 20 so one of the optical beams is directed to the lens 412 and the other optical beam is directed to the orthogonally positioned lens 412, as is understandable to one skilled in the art upon reading and understanding this document.

The first lens 411 receives the pump beam 187 from the first polarization maintaining fiber 201-1 and directs the pump beam 187 to a first surface 421 of a 50/50 polarization-insensitive beamsplitter 420. Likewise, a second lens 412 receives the pump beam 187 from the second polarization maintaining fiber 201-1 and directs the pump beam 187 to a second surface 422 of a 50/50 beamsplitter 420. One of the surfaces of 420 is coated to provide the 50/50 splitting function while the other is preferably antireflection (AR) coated to reduce optical losses of the system.

The 50/50 beamsplitter 420 reflects 50% and transmits 50% of both polarizations (s and p) of the pump beam 187 that is incident on the first surface 421 and/or the second surface 422. The 50/50 beamsplitter 420 is also referred to herein as a "polarization maintaining splitter 420" that has a substantially 50% tap ratio. Only the p-polarized beam is shown for clarity.

The p-polarized pump beam 187 is split into two beams with substantially equal power and polarization states. One beam 187-1 is directed as p-polarized pump beam to a first surface 451 of a polarization beam combiner (PBC) 450, the other beam 187-2 is directed also as a p-polarized beam to mirror 430. Mirror 430 reflects p-polarized pump beam 187-2 toward a polarization rotator 440. The polarization rotator 440 rotates the p-polarized pump beam 187-2 to an s-polarized pump beam 187-2R (also referred to herein as "rotated second optical pump beam 187-2R"). The s-polarized pump beam 187-2R is output from the polarization rotator 440 and propagates toward the mirror 445. The mirror 445 reflects the s-polarized pump beam 187-2R toward a second surface 452 of the PBC 450.

The polarization beam combiner 450 (shown as a polarization beamsplitter cube 450 in FIG. 4) is configured to combine the two beams 187-1 and 187-2R having orthogonal polarizations. The surface 452 is perpendicular to the surface 451 of the PBC 450. Other configurations for the polarization beam combiner 450 are possible.

The optical path from the 50/50 beamsplitter 420 to the first surface 451 of the polarization beamsplitter cube 450 is referred to herein as a first optical path along which a first optical pump beam 187-1 propagates. The optical path from the 50/50 beamsplitter 420 to the polarization rotator 440 and on to the second surface 452 of the polarization beamsplitter cube 450 is referred to herein as a second optical path along which a second optical pump beam 187-2/187-2R propagates.

The s-polarized pump beam 187-2R is reflected by the PBC 450 and directed to a wavelength division multiplexer mirror 460 (also referred to herein as a wavelength division multiplexer 460). The p-polarized pump beam 187-1 is transmitted by the polarizing beamsplitter cube 450 and directed to the wavelength division multiplexer mirror 460. The optical components in the integrated micro-optic device 20 are aligned so that the reflected s-polarized pump beam 187-2R overlaps and is aligned to propagate on the same optical path as the transmitted p-polarized pump beam 187-1 in order to form a substantially unpolarized optical pump beam 186.

The unpolarized optical pump beam 186 is incident on the wavelength division multiplexer (WDM) mirror 460. The WDM mirror 460 transmits wavelengths less than the wavelength range of light in the ASE beam generated by a doped optical fiber 140, including the wavelength $\lambda_p$ of the unpolarized optical pump beam 186. The WDM mirror 460 reflects light having wavelengths within the wavelength range of the amplified stimulated emission generated by the doped optical fiber 140 in the system 13. As shown in FIG. 4, the WDM mirror 460 is slightly tilted to couple (via one or more coupling lenses 413) the transmitted unpolarized optical pump beam 186 into an input end of the third polarization maintaining fiber 201-3. The third polarization maintaining fiber 201-3 is coupled to the doped optical fiber 140 and, as described above, the pump wavelength $\lambda_p$ stimulates the dopants in the doped optical fiber 140 so that the stable broadband ASE 190 positioned on the spontaneous emission wavelength $\lambda_{ASE}$ is coupled backward to the WDM mirror 460.

The WDM mirror 460 reflects the stable broadband ASE 190 into the fourth polarization maintaining fiber 201-4 (via the lens 413). The fourth polarization maintaining fiber 201-4 (also referred to herein as the second output 201-4 of the optical system 20) directs the stable broadband ASE 190 to an external device, such as an interferometric fiber optic gyroscope (IFOG). Other applications that can use the stable broadband ASE 190 generated by systems 10-13, such as a dense wavelength division multiplexing (DWDM) device, spectrum sliced sources, optical sensor systems, fiber optic gyroscopes (FOG), and optical coherence tomography (OCT).

In one implementation of this embodiment, the polarizing beamsplitter cube 450 is replaced by another optical component that is operable to transmit p-polarized light and to reflect s-polarized light of the selected pump wavelength $\lambda_p$. In another implementation of this embodiment, the polarizing beam combiner 450 is operable to transmit s-polarized light and to reflect p-polarized light of the selected pump wavelength $\lambda_p$ and either the polarization rotator 440 is in the first optical path or the optical pump source 100-1 and/or 100-2 are configured to provide s-polarized pump power to the first polarization maintaining fiber 201-1 and/or second polarization maintaining fiber 201-1, respectively. As is understandable to one skilled in the art upon reading this document, there other possible configurations of integrated micro optic devices that can be used to receive polarized pump beams 187 from one or both of the optical pump sources 100(1-2) and to output an unpolarized optical pump beam 188 to the doped optical fiber 140 and to output a stable broadband ASE 190 from the integrated micro-optic device.

Figure 5:
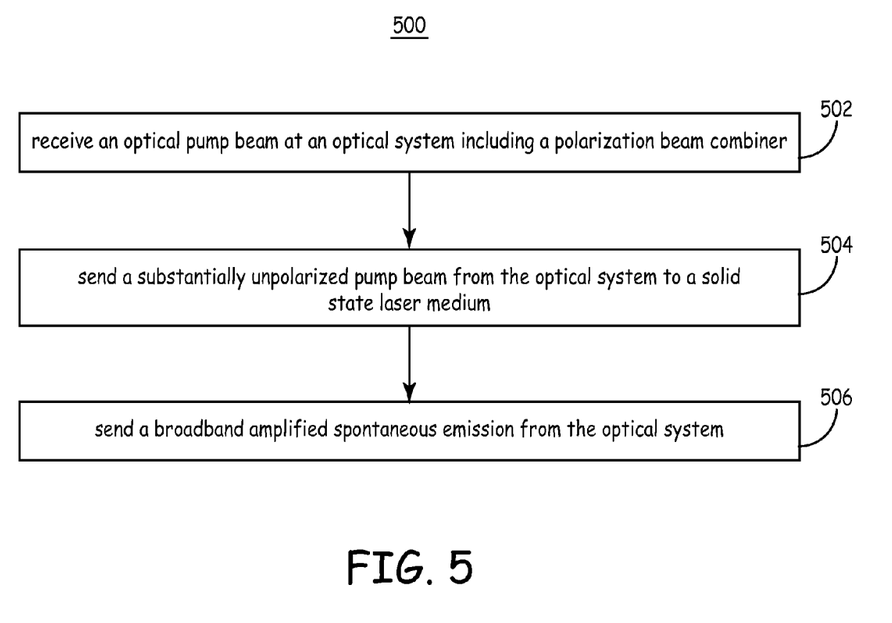
FIG. 5 is a flow diagram of one embodiment of a method to generate broadband amplified spontaneous emission having a stable mean wavelength in accordance with the present invention.

FIG. 5 is a flow diagram of one embodiment of a method 500 to generate broadband amplified spontaneous emission having a stable mean wavelength in accordance with the present invention. Method 500 can be implemented by the various embodiments of the broadband light sources, such as broadband light sources 10, 11, 12, or 13, as described above.

At block 502, an optical pump beam is received at an optical system that includes a polarization beam combiner. The polarization beam combiner in conjunction with other optical elements acts on the optical pump beam to generate an unpolarized pump beam. This is possible regardless of the input polarization of the optical beam received from the optical pump source. In one implementation of this embodiment, a first optical pump beam 189 is received from a first optical pump source 100-1. If a failure or degradation of the first optical pump source 100-1 is detected, then a second optical pump beam is received from a second optical pump source based on the detected failure or degradation. In one implementation of this embodiment, the first optical pump source 100-1 is monitored by a detector 96 within the laser package of the optical pump source 100-1. In another implementation of this embodiment, the first optical pump source 100-1 is monitored by a detector configured to sense light at some point within the optical system 15 or at one of the first or second outputs of the optical system 10.

At block 504, a substantially unpolarized pump beam is sent from the optical system to a solid state laser medium. In one implementation of this embodiment, the solid state laser medium is a doped optical fiber. The solid state laser medium is configured to emit broadband amplified spontaneous emission back into a wavelength division multiplexing device in the optical system.

At block 506, a broadband amplified spontaneous emission is sent from the optical system. The emitted broadband amplified spontaneous emission that was directed from the solid state laser medium back into a wavelength division multiplexing device is directed back out of the optical system by the wavelength division multiplexing device.

Although specific embodiments have been illustrated and described herein, it will be appreciated by those skilled in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A broadband light source configured to emit a stable broadband optical beam, the broadband light source comprising:
   at least one optical pump source;
   an optical system including a polarization beam combiner, the optical system configured to receive at least one optical pump beam having a respective at least one pump coherence length from a respective one of the at least one optical pump source, and from that at least one optical pump beam produce a substantially unpolarized pump beam as a first output; and
   a solid state laser medium to receive the substantially unpolarized pump beam from the first output of the optical system and emit a stable broadband amplified spontaneous emission back to the optical system, wherein the stable broadband amplified spontaneous emission is output from a second output of the optical system;
   wherein the optical system further includes a polarization maintaining splitter having a tap ratio substantially close to 50%, the polarization maintaining splitter configured to receive the at least one optical pump beam from a respective one of the at least one optical pump source at a respective input and to output first and second optical pump beams having substantially equal amplitudes and polarizations, wherein the first and second optical pump beams propagate along respective first and second optical paths, wherein one of the first and second optical paths includes a rotational component, wherein the rotational component rotates the polarization of one of the first and second optical pump beams with respect to the polarization of one of the respective second and first optical pump beams, wherein the first and second optical paths have a length difference greater than the at least one pump coherence length, wherein the polarization beam combiner receives the orthogonally polarized first and second optical pump beams propagating along the first and second optical paths, respectively, wherein the polarization beam combiner outputs the substantially unpolarized pump beam; and a wavelength division multiplexer coupler configured to receive the substantially unpolarized pump beam, wherein a first output of the wavelength division multiplexer directs the substantially unpolarized pump beam to the solid state laser medium and wherein the stable broadband amplified spontaneous emission is output from a second output of the wavelength division multiplexer.

2. The broadband light source of claim 1, wherein the first output of the wavelength division multiplexer coupler comprises the first output of the optical system.

3. A broadband light source configured to emit a stable broadband optical beam, the broadband light source comprising:
at least one optical pump source;
an optical system including a polarization beam combiner, the optical system configured to receive at least one optical pump beam having a respective at least one pump coherence length from a respective one of the at least one optical pump source, and from that at least one optical pump beam produce a substantially unpolarized pump beam as a first output; and
a solid state laser medium to receive the substantially unpolarized pump beam from the first output of the optical system and emit a stable broadband amplified spontaneous emission back to the optical system, wherein the stable broadband amplified spontaneous emission is output from a second output of the optical system;
wherein the solid state laser medium comprises a doped optical fiber, the optical system further comprising:
a 2×2 polarization maintaining coupler having a tap ratio substantially close to 50%, the 2×2 polarization maintaining coupler configured to receive the at least one optical pump beam from a respective one of the at least one optical pump source;
a first output fiber coupled to receive a first optical pump beam from the 2×2 polarization maintaining coupler;
a second output fiber coupled to receive a second optical pump beam from the 2×2 polarization maintaining coupler, the first optical pump beam being substantially equal in amplitude to the second optical pump beam, wherein an output of the second output fiber is orthogonal to an output of the first output fiber, wherein the polarization beam combiner receives and combines the orthogonally polarized first and second optical pump beams from the first and second optical fibers, respectively, to form the substantially unpolarized pump beam; and
a wavelength division multiplexer coupler, wherein the first and second outputs of the optical system include first and second outputs of the wavelength division multiplexer coupler, the wavelength division multiplexer coupler configured to receive the substantially unpolarized pump beam, wherein the first output of the wavelength division multiplexer coupler directs the substantially unpolarized pump beam to the doped optical fiber and wherein the stable broadband amplified spontaneous emission is output from the second output of the wavelength division multiplexer coupler.

4. The broadband light source of claim 1, wherein a mean wavelength of the stable broadband amplified spontaneous emission varies by less than a few parts per million (ppm) of the mean wavelength.

5. The broadband light source of claim 1, wherein the solid state laser medium is a doped optical fiber.

6. The broadband light source of claim 1, wherein the at least one optical pump source comprises:
a first optical pump source for emitting a first pump beam in a first polarization when in an ON state; and
a second optical pump source for emitting a second pump beam in a second polarization when in an ON state, wherein the stable broadband amplified spontaneous emission is output from the second output of the optical system when either one or both of the first optical pump source and the second optical pump source is in the ON state, and wherein the stable broadband amplified spontaneous emission output from the second output is independent of the first polarization and the second polarization.

7. The broadband light source of claim 6, wherein the second optical pump source is a backup optical pump source in the event of one of a failure and a degradation of the first optical pump source.

8. A broadband light source configured to emit a stable broadband optical beam, the broadband light source comprising:
at least one optical pump source;
an optical system including:
a polarization maintaining splitter having a tap ratio substantially close to 50%, the polarization maintaining splitter configured to receive at least one optical pump beam having a respective at least one pump coherence length from a respective one of the at least one optical pump source at a respective input and to output first and second optical pump beams having substantially equal amplitudes and polarizations, wherein the first and second optical pump beams propagate along respective first and second optical paths, wherein the first and second optical paths have a length difference greater than the at least one pump coherence length;
a rotational component in one of the first and second optical paths, wherein the rotational component rotates the polarization of the respective first and second optical pump beam by 90 degrees with respect to the polarization of the respective second and first optical pump beam;
a polarization beam combiner to receive the orthogonally polarized first and second optical pump beams from the first and second optical paths, and output a substantially unpolarized pump beam; and
a wavelength division multiplexer configured to receive the substantially unpolarized pump beam, wherein a first output of the wavelength division multiplexer directs the substantially unpolarized pump beam to a solid state laser medium and wherein stable broadband amplified spontaneous emission (ASE) is output from a second output of the wavelength division multiplexer.

9. The broadband light source of claim 8, further comprising:
the solid state laser medium to receive the substantially unpolarized pump beam from the first output of the wavelength division multiplexer, to generate the stable broadband amplified spontaneous emission, and to direct the generated stable broadband amplified spontaneous emission back to the first output of the wavelength division multiplexer.

10. The broadband light source of claim 8, wherein the at least one optical pump source comprises:

a first optical pump source for emitting a first pump beam in a first polarization when in an ON state; and
a second optical pump source having a second pump beam in a second polarization when in an ON state, wherein the stable broadband amplified spontaneous emission is output from the second output of the optical system when either one or both of the first optical pump source and the second optical pump source is in the ON state, and wherein the stable broadband amplified spontaneous emission output from the second output is independent of the first polarization and the second polarization.

* * * * *